United States Patent [19]
Weber

[11] Patent Number: 6,135,874
[45] Date of Patent: Oct. 24, 2000

[54] VENTILATION DEVICE FOR A SIDE WINDOW OF A MOTOR VEHICLE AND METHOD OF MAKING SAME

[75] Inventor: Norbert Weber, Bondorf, Germany

[73] Assignee: DaimlerChrysler AG, Stuttgart, Germany

[21] Appl. No.: 09/273,719

[22] Filed: Mar. 22, 1999

[30] Foreign Application Priority Data

Mar. 21, 1998 [DE] Germany .......................... 198 12 489

[51] Int. Cl.⁷ ...................................................... B60S 1/54
[52] U.S. Cl. ............................................................ 454/124
[58] Field of Search ................................... 454/124, 121, 454/126

[56] References Cited

U.S. PATENT DOCUMENTS

| Re. 33,981 | 6/1992 | nilsson .................................... 454/124 |
| 3,602,126 | 8/1971 | Rreitschwerdt ......................... 454/124 |
| 3,715,966 | 2/1973 | Miettinen . |
| 3,835,757 | 9/1974 | Shakespear et al. . |
| 4,173,174 | 11/1979 | Vinko et al. ............................. 454/124 |
| 4,413,550 | 11/1983 | Piano . |
| 4,459,901 | 7/1984 | watanaby ................................. 454/124 |
| 4,903,581 | 2/1990 | Nilsson . |

FOREIGN PATENT DOCUMENTS

| 2122690 | 11/1972 | Germany . |
| 2636640A1 | 2/1978 | Germany . |
| 30852 | 2/1983 | Japan ...................................... 454/124 |
| 76317 | 5/1983 | Japan ...................................... 454/124 |

OTHER PUBLICATIONS

United Kingdom Combined Search and Examination Report, May 27, 1999.

*Primary Examiner*—Pamela Wilson
*Assistant Examiner*—Derek S. Boles
*Attorney, Agent, or Firm*—Evenson, McKeown, Edwards & Lenahan, P.L.L.C.

[57] ABSTRACT

A device for ventilating a side window of a motor vehicle, especially an automobile, has an air guide channel that is located in a vehicle door or other side component that contains the side window near a lower area of the side window. Air outlets of the guide channel are directed at the side window and are located in an area that faces the inside window. The ventilating device is made, especially in areas visible to vehicle occupants, in a suitable visual design. The air guide channel is formed in a separate channel part that is mounted on the vehicle side component and which contains air outlets that terminate in the vicinity of a gap formed between the vehicle side component and the side window.

23 Claims, 2 Drawing Sheets

VENTILATION DEVICE FOR A SIDE WINDOW OF A MOTOR VEHICLE AND METHOD OF MAKING SAME

BACKGROUND AND SUMMARY OF THE INVENTION

This application claims the priority of German application 198 12 489.9-16, filed in Germany on Mar. 21, 1998, the disclosure of which is expressly incorporated by reference herein.

The invention relates to a device for ventilating a side window of a motor vehicle. Preferred embodiments of the invention relate to a passenger automobile with a vehicle door containing a window.

A ventilating device of the general type referred to above is known from German Patent Document DE-OS 26 36 640, in which a hollow space is formed in a panel of a vehicle side door, said space serving as an air guide channel of the ventilating device. In the panel, slit-like passageway openings are provided on an exterior associated with the side window of the door, through which openings air can flow out in the direction of the side window, said air having been introduced into the air guide channel, especially conditioned air. The panel that contains the air outlets constitutes a separate part installed to produce the known ventilating device instead of an otherwise conventional panel without outlet openings. The assembly process, especially as part of a conveyor belt assembly line, is therefore relatively cumbersome in design, since one or the other panel must be installed depending on the equipment package of the vehicle. In addition, the panel provided with the air openings must be manufactured extremely carefully since the air outlets considerably influence the overall visual impression made by the vehicle interior trim. To improve the visual impression, it is proposed for the known ventilating device to equip the passageway openings with aesthetically attractive separate covering elements, resulting in an additional increase in the cost of manufacturing such a panel.

An elastic sealing profile for enclosing in particular the lower edge of a motor vehicle window is known from German Patent Document DE-OS 21 22 690. Such a sealing profile can be used exclusively for window panes that cannot be lowered, for example a windshield or a rear window. A cavity is formed in the known sealing profile, said cavity being located below the window enclosed by the sealing profile on both sides in its marginal area. This channel communicates with a condensate-receiving gutter formed in the exterior of the sealing profile that faces the vehicle interior, making it possible to carry away water of condensation through appropriate lines. In addition, the channel obtained in the sealing profile is exposed to air which can flow against the lower part of the window because of the communicating connection between the channel and the receiving gutter for the condensate.

A problem addressed by the present invention is to design a ventilating device of the species recited at the outset in such fashion that it can be manufactured in simple fashion and in particular meets higher visual aesthetic requirements.

This problem is solved according to the invention by a ventilating device for ventilating a side window of a motor vehicle, especially an automobile, with an air guide channel that is located in a vehicle side component containing the side window, especially of a vehicle door, close to a lower area of the side window, with air outlets directed at the side window being located on this vehicle side component in an end area facing the side window, wherein the air guide channel is formed in a separate channel part which is mounted on or in the vehicle side component and contains air outlets which terminate in an area of a gap formed between the vehicle side component and side window.

The invention is based on the general idea of combining the air guide channel and the air outlets into one part that can be installed completely as a unit, so that assembly, for example in mass production, is considerably simplified. The outside of the vehicle side component that faces the vehicle interior does not have to be changed for the assembly arrangement. The flow of the air against the side window is made possible by a gap formed between the side component of the vehicle and the side window in which the air outlets of the air guide channel terminate. A gap of this kind as a rule is already present in conventional vehicle side components to receive sealing profiles or the like. The gap according to the invention used to direct flow against the side window therefore can be made available by simply omitting the sealing profile or the like, so that no redesign of the vehicle side component is required for the purpose.

In an advantageous embodiment, a sealing profile is located below the gap or below the outlets of the channel part in order to guarantee any sealing and/or stabilization of the side window that may be necessary.

On the basis of the arrangement of the outlets in the vicinity of the gap, proposed according to the invention, the air outlets are in an area that the vehicle occupant cannot see and that cannot adversely influence the visual and/or esthetic impression of the vehicle interior trim. The gap which itself is visible can be made with a relatively limited width and will be scarcely noticed, especially because of mirror effects in the vicinity of the side window, so that the advantageous impression of a seamless transition between the window and the vehicle part can result.

In manufacturing the channel part and/or its air outlets, therefore, no particular care or accuracy need be observed, so that the cost of manufacturing is considerably reduced.

In an advantageous embodiment of the ventilation device according to the invention, the channel part can penetrate the gap between the vehicle side component and the side window, and have a collar that covers a marginal area of the vehicle side component that borders the gap and faces the vehicle interior, with the air outlets then terminating in a gap area that is open toward the top and is formed between the channel part and the side window. With this measure, the air outlet area of the gap formed between the vehicle side component and the side window can be reduced, so that the flow velocities that can be produced can be increased to achieve a more efficient ventilation of the side window. Moreover, this allows the gap to be covered to the greatest extent possible in order to additionally improve the visual impression at the transitional area between the vehicle side component and the side window.

Preferably, the collar of the channel part can be designed as an edge trim strip so that even the highest esthetic demands can be met.

According to advantageous embodiments of the ventilating device according to the invention, the channel part can be located completely inside the vehicle side component, with the air outlets then being located below a marginal area of the vehicle component that abuts the gap and faces the vehicle interior. This measure utilizes the gap between the vehicle side component and the side window, which is present in any case, to ventilate the side window, making this embodiment especially economical.

According to another improvement on the ventilation device according to the invention, a sealing profile can be provided on the channel part that abuts the side window in a sealing fashion. By this measure, firstly a sufficient sealing of the side window can be ensured and secondly, with a sufficient pressure of the sealing profile against the side window, a stabilization and/or positioning of the side window can be achieved. This is especially significant when the side window is a side window that can be lowered.

In preferred embodiments of the ventilating device according to the invention, an outside wall of the channel part that faces the side window can be designed as a sealing profile that abuts the side window with a sealing action. An embodiment of this kind permits an efficient combination of several functional parts into structural elements that can be installed complete and which performs a plurality of functions, in this case: supplying air and producing a sealing effect.

In advantageous preferred embodiments of the device according to the invention, the channel part can communicate with an air supply that is connected to an air conditioning system of a motor vehicle and runs in the vehicle side component. These embodiments are especially advantageous if an air feed is already provided in a corresponding vehicle side part that serves for example to supply air to the rear of an automobile. The ventilating device according to the invention in this case can be connected especially simply to the existing air supply.

Other objects, advantages and novel features of the present invention will become apparent from the following detailed description of the invention when considered in conjunction with the accompanying drawings.

DETAILED DESCRIPTION OF THE DRAWINGS

Figure 1:
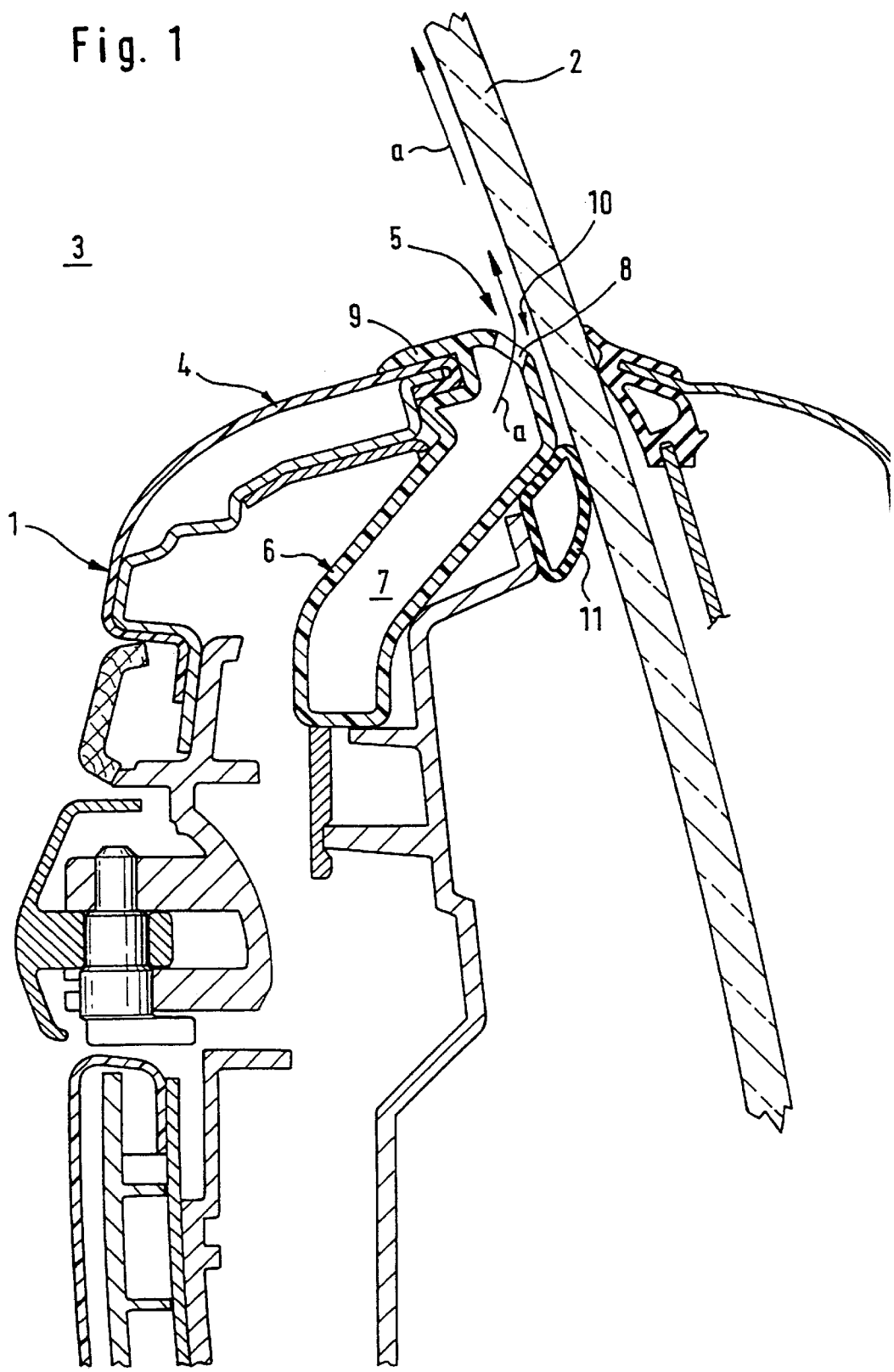
FIG. 1 is a cross sectional view through a transitional area between a vehicle side door and a side window that can be lowered in said door, with the vehicle door being equipped with the ventilating device according to the invention.
Figure 2:
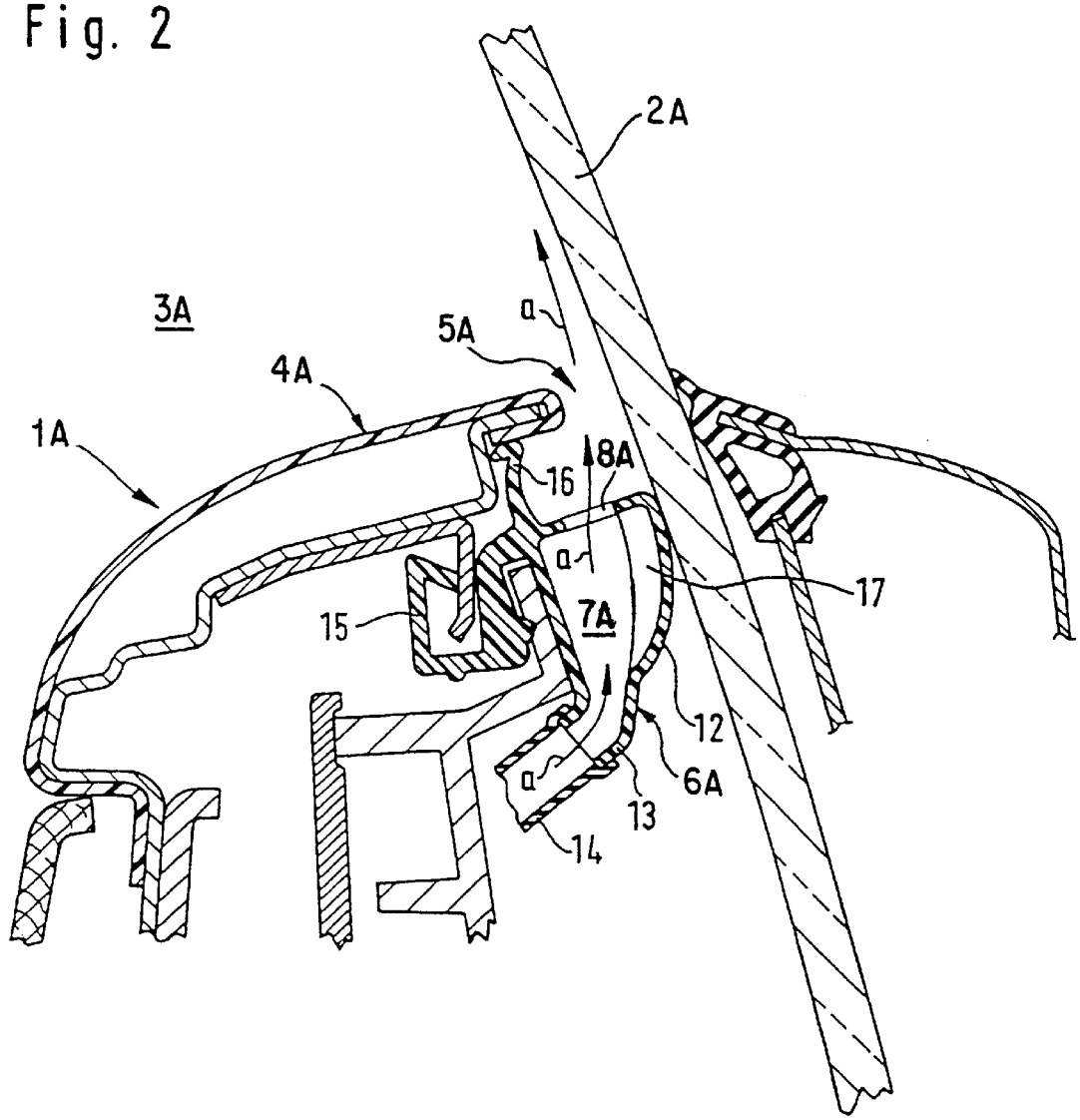
FIG. 2 is a cross sectional view as in FIG. 1, a with a different embodiment of a ventilating device according to the invention.

According to FIGS. 1 and 2, a vehicle side component 1 designed as a vehicle side door is equipped with a side window 2 that can be lowered downward into the vehicle door 1. The drive means and guide means required for lifting of side window 2 are not shown. An upper outer side 4 of the vehicle door 1 that is exposed to a vehicle interior 3 can be designed as a separate covering element that is mounted for example on a base support of the vehicle door. In the vicinity of its upper exterior 4 a gap 5 is formed between the vehicle door 1 and the side window 7, in which gap 5, in conventional vehicle doors 1, a sealing profile or the like for sealing and also for lateral stabilization of side window 2 is mounted.

A channel part 6 is located in the interior of the vehicle side component or vehicle door 1, said part 6 containing an air guide channel 7. In addition, channel part 6 has air outlets 8 in the vicinity of the gap 5, said outlets communicating with the air guide channel 7. Air guide channel 7 in turn is connected to an air conditioner in the vehicle, not shown, and is supplied with air-conditioned, especially tempered, air driven by a blower for example. The air supplied through air guide channel 7 can escape as indicated by arrows a from air outlets 8 and can flow upward along side window 2. As a result of this flow, precipitation that has formed on the inside of side window 2 can be rapidly eliminated and the formation of new precipitation can be prevented, and an air layer can be formed alongside window 2 that produces an efficient insulation of vehicle interior 3.

According to FIG. 1, the channel part 6 extends through the gap 5 thus formed between the upper exterior 4 of the vehicle door 1 and side window 2. At the end of the channel part 6 that penetrates gap 5, a collar 9 is provided that overlaps a marginal area of vehicle door 1 that abuts gap 5 and rests on the upper exterior 4 of vehicle door 1. Collar 9 can be designed as an edge trim strip and in particular can rest on the upper exterior 4 of door 1 without any play and without a gap.

In the portion of channel part 6 that penetrates gap 5, the air outlets 8 are located on the side of channel part 6 that faces window 2, with a gap space 10 that is open at the top being formed in this area between channel part 6 and side window 2, in which space the air outlets 8 terminate. The air that is supplied through air guide channel 7 to air outlets 8 can escape through air outlets 8 into the gap space 10 and from the latter as indicated by arrow a upward alongside window 2 Below gap 5, a sealing profile 11 is provided on the side of channel part 6 that faces side window 2, said profile abutting side window 2 in a sealing and stabilizing fashion.

Channel part 6 usually extends along the entire length of side window 2 in the vehicle side component or in vehicle door 1. Channel part 6 is also connected at a point that is not visible in FIG. 1 to the air conditioner of the vehicle.

According to FIG. 2, in another embodiment of the ventilating device according to the invention, similar reference numbers with a suffix "A" are used for similar functioning features as in FIG. 1. Unless otherwise indicated the description of these features is similar for FIGS. 1 and 2. In FIG. 2, channel part 6A is accommodated completely inside vehicle side door 1A. Air outlets 8A are located in an upper side of the channel part 6A that faces gap 5A and terminate in the lower area of gap 5A.

An outside wall 12 of channel part 6A that faces side window 2A is designed in the embodiment according to FIG. 2 as a sealing profile. This outside wall and/or sealing profile 12 in turn abuts side window 2A in a sealing and stabilizing fashion.

In order to achieve a contact between outside wall 12 and side window 2A that is as effective as possible, ribs 17 run transversely to the lengthwise direction of air guide channel 7A located on the inside of outside wall 12 that faces air guide channel 7A, said ribs producing a stiffening or strengthening of outside wall 12. Channel part 6A in the embodiment shown in FIG. 2 with an integrated sealing profile 12 is made of a material that is conventional for such seals, especially rubber.

In this embodiment of FIG. 2, channel part 6A also has retaining elements 15 and supporting elements 16 that cooperate with matching surfaces, angular elements, and supporting structures inside vehicle door 1A and ensure reliable anchoring of channel part 6A in vehicle door 1A.

The section in FIG. 2 is located at approximately the height at which a connecting stub 13 is located, through which air guide channel 7A communicates with the air conditioner of the vehicle which, according to FIG. 2 for example, is a hose 14.

In both the embodiment shown in FIG. 1 and the one shown in FIG. 2, air outlets 8, 8A usually cannot be seen by a vehicle occupant. He or she sees only gap 5A (in an embodiment according to FIG. 2) or the gap space 10 (in an embodiment corresponding to FIG. 1), which however does not form a distracting contour in the transitional area between the upper exterior 4 and side window 2, but at this location it has a natural appearance or is barely noticed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for ventilating a side window of a motor vehicle, especially an automobile, with an air guide channel that is located in a vehicle side component containing the side window, especially of a vehicle door, close to a lower area of the side window, with air outlets directed at the side window being located on this vehicle side component in an end area facing the side window, wherein the air guide channel is formed in a separate channel part which is independent of and mounted on or in the vehicle side component and contains air outlets which terminate in an area of a gap formed between the vehicle side component and side window.

2. Ventilating device according claim 1, wherein the channel part penetrates the gap between the vehicle side component and the side window and has a collar which covers a marginal area of the vehicle side component that borders the gap and faces a vehicle interior, and wherein the air outlets terminate in a gap space that is open at the top and is formed between the channel part and the side window.

3. Ventilating device according to claim 2, wherein the collar of the channel part is designed as an edge trim strip.

4. Ventilating device according to claim 1, wherein the channel part is located completely inside the vehicle side component, with the air outlets being located below a marginal area of the vehicle side component that borders the gap and faces a vehicle interior.

5. Ventilating device according to claim 1, wherein a sealing profile is mounted on the channel part and abuts the side window in a sealing fashion.

6. Ventilating device according to claim 2, wherein a sealing profile is mounted on the channel part and abuts the side window in a sealing fashion.

7. Ventilating device according to claim 3, wherein a sealing profile is mounted on the channel part and abuts the side window in a sealing fashion.

8. Ventilating device according to claim 4, wherein a sealing profile is mounted on the channel part and abuts the side window in a sealing fashion.

9. Ventilating device according to claim 1, wherein an outside wall of the channel part f aces the side window in a sealing fashion.

10. Ventilating device according to claim 9, wherein reinforcing ribs that run transversely to the lengthwise direction of the air guide channel are located on the side facing the ventilation channel on the outside wall of the channel part designed as a sealing profile, said ribs reinforcing a pretensioning force of the outside wall against the side window.

11. Ventilating device according to claim 1, wherein the channel part communicates with an air feed that is connected to an air conditioner of the vehicle and extends in the vehicle side component.

12. Ventilating device according to claim 2, wherein the channel part communicates with an air feed that is connected to an air conditioner of the vehicle and extends in the vehicle side component.

13. Ventilating device according to claim 3, wherein the channel part communicates with an air feed that is connected to an air conditioner of the vehicle and extends in the vehicle side component.

14. Ventilating device according to claim 4, wherein the channel part communicates with an air feed that is connected to an air conditioner of the vehicle and extends in the vehicle side component.

15. Ventilating device according to claim 5, wherein the channel part communicates with an air feed that is connected to an air conditioner of the vehicle and extends in the vehicle side component.

16. Ventilating device according to claim 1, wherein the side window is designed to be lowerable in the vehicle side component.

17. Ventilating device according to claim 1, wherein the vehicle side component is designed as a vehicle side door.

18. A ventilation assembly for ventilating a vehicle interior facing surface of a side window of a vehicle which is supported at a vehicle component, comprising:

a channel part mountable on a vehicle component, said channel part forming a separate duct component from the vehicle component structure which in use defines an opening for a side window supported by the vehicle component, wherein said channel part includes an air guide channel and air outlets which terminate in an area of a gap formed between the vehicle component and the side window.

19. A ventilation assembly according to claim 18, wherein the vehicle component is a side door and the window is slidably movable in said vehicle component, said channel part being separate from interior door panels of the side door.

20. A ventilation assembly according to claim 18, wherein said channel part is an integral one-piece part.

21. A method of making a ventilation assembly for ventilating a vehicle interior facing surface of a side window of a vehicle which is supported at a vehicle component, comprising:

providing a hollow one-piece channel part, and mounting the channel part on a vehicle component with said channel part being separate from vehicle component structure which in use defines an opening for a side window supported by the vehicle component, wherein said channel part includes an air guide channel and air outlets which terminate in an area of a gap formed between the vehicle component and the side window.

22. A method according to claim 21, wherein the vehicle component is a side door and the window is slidably movable in said vehicle component, said channel part being separate from interior door panels of the side door.

23. A method according to claim 21, wherein said channel part is an integral one-piece part.

\* \* \* \* \*